United States Patent
Wandera et al.

(10) Patent No.: US 11,374,227 B2
(45) Date of Patent: Jun. 28, 2022

(54) DRY PROCESS ELECTRICALLY CONDUCTIVE COMPOSITE FORMATION

(71) Applicant: AMTEK RESEARCH INTERNATIONAL LLC, Lebanon, OR (US)

(72) Inventors: Daniel Wandera, Corvallis, OR (US); Jeff M. Frenzel, Albany, OR (US); Robert Waterhouse, Lebanon, OR (US); Richard W. Pekala, Corvallis, OR (US)

(73) Assignee: Amtek Research International LLC, Lebanon, OR (US)

( * ) Notice: Subject to any disclaimer, the term of this patent is extended or adjusted under 35 U.S.C. 154(b) by 612 days.

(21) Appl. No.: 15/887,565

(22) Filed: Feb. 2, 2018

(65) Prior Publication Data
US 2019/0245211 A1   Aug. 8, 2019

(51) Int. Cl.
| | |
|---|---|
| H01M 4/66 | (2006.01) |
| H01M 4/80 | (2006.01) |
| H01G 11/26 | (2013.01) |
| H01G 11/86 | (2013.01) |
| H01M 4/76 | (2006.01) |
| H01M 4/02 | (2006.01) |

(52) U.S. Cl.
CPC .......... *H01M 4/668* (2013.01); *H01G 11/26* (2013.01); *H01G 11/86* (2013.01); *H01M 4/661* (2013.01); *H01M 4/765* (2013.01); *H01M 4/808* (2013.01); *H01M 2004/025* (2013.01)

(58) Field of Classification Search
CPC .................................................... H01M 4/668
See application file for complete search history.

(56) References Cited

U.S. PATENT DOCUMENTS

| | | |
|---|---|---|
| 3,086,247 A | 4/1963 | Rubens |
| 3,457,217 A | 7/1969 | Oxel |
| 5,605,569 A | 2/1997 | Boyer et al. |
| 6,635,202 B1 | 10/2003 | Bugg et al. |
| 2002/0001753 A1 | 1/2002 | Pekala et al. |
| 2002/0037448 A1 | 3/2002 | Fitts et al. |
| 2006/0172198 A1 | 8/2006 | Kakizaki et al. |
| 2008/0113259 A1 | 5/2008 | Brilmyer et al. |
| 2009/0078918 A1 | 3/2009 | Huettner et al. |
| 2010/0035127 A1 | 2/2010 | Brilmyer et al. |
| 2012/0070714 A1 | 3/2012 | Chambers et al. |
| 2012/0145468 A1 | 6/2012 | Pekala et al. |
| 2014/0033401 A1 | 2/2014 | Del Guasta et al. |
| 2015/0207121 A1 | 7/2015 | Frenzel et al. |
| 2015/0361241 A1 | 12/2015 | Loomis et al. |
| 2016/0104882 A1 | 4/2016 | Yushin et al. |
| 2016/0310924 A1* | 10/2016 | Nakatomi ........... H01M 4/0404 |
| 2019/0169395 A1 | 6/2019 | Warner et al. |

FOREIGN PATENT DOCUMENTS

| | | |
|---|---|---|
| CN | 102177601 A | 9/2011 |
| JP | 2001143680 A | 5/2001 |
| WO | 2007143646 A3 | 12/2007 |
| WO | 2010147888 A3 | 12/2010 |
| WO | 2018027187 A1 | 2/2018 |
| WO | 2019152831 A1 | 8/2019 |

OTHER PUBLICATIONS

PCT/US2017/045612, International Preliminary Report and Patentability, dated Feb. 14, 2019, 7 pages.
PCT/US2019/016333, International Search Report and Written Opinion, dated Mar. 26, 2019, 10 pages.
PCT/US2017/045612, International Search Report and Written Opinion, dated Oct. 13, 2017, 13 pages.
Wandera, Office Action dated Jan. 6, 2021 for U.S. Appl. No. 16/323,135.
Wandera, Office Action dated Nov. 12, 2021 for U.S. Appl. No. 16/323,135.

* cited by examiner

*Primary Examiner* — Stephan J Essex
(74) *Attorney, Agent, or Firm* — Dorsey & Whitney LLP

(57) ABSTRACT

An electrically conductive porous composite composed of an expanded microsphere matrix binding a material composition having electrical conductivity properties to form an electrically conductive porous composite is disclosed herein. An energy storage device incorporating the electrically conductive porous composite is also disclosed herein.

17 Claims, No Drawings

DRY PROCESS ELECTRICALLY CONDUCTIVE COMPOSITE FORMATION

COPYRIGHT NOTICE

© 2018 Amtek Research International LLC. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

The present disclosure relates to the formation of electrically conductive porous composites that (1) exhibit good porosity without use of a process oil and attendant extraction solvent and (2) exhibit sufficient electrolyte wettability. Such electrically conductive porous composites can be used as electrodes to improve the manufacturability and performance of energy storage devices such as batteries and ultracapacitors.

BACKGROUND INFORMATION

The following background information is presented by way of example with reference to the manufacture of electrodes used in energy storage devices. Descriptions of the construction details of energy storage devices relevant to (but not limiting of) the composites disclosed herein are set forth in David Linden (Editor in Chief), *Handbook of Batteries*, $2^{nd}$ ed., McGraw-Hill, Inc. (1995) and A. Burke, Ultracapacitors: why, how, and where is the technology, *J. Power Sources* 91, (2000) pp. 37-50.

Electrode preparation for many energy storage devices begins with formation of a slurry containing an electrochemically active material in powder form, a fluoropolymer, and solvent. The slurry is coated onto a metal foil that acts as a current collector. The metal foil coated with the electrochemically active material is then passed through a drying oven to remove the solvent. The fluoropolymer acts as a binder that holds together the electrochemically active material and forms a porous electrode. Often the electrode is calendered to densify the electrochemically active material coated on the current collector by increasing the volume or packing fraction of the electrochemically active material and thereby reducing the porosity of the electrode. The current collector functions also as a carrier for the electrochemically active material and the binder because the combination of the two of them is of insufficient mechanical integrity to stand on its own. The electrode is then cut into ribbons for winding or stacking into a packaged energy storage device.

As such, there also continues to be a need for an electrode that is manufactured without the use of hazardous and/or flammable solvents. The electrode should exhibit desired properties such as good electrolyte wettability and good porosity and facilitate an energy storage device with high cycling and recharge capability.

SUMMARY OF THE DISCLOSURE

It has been discovered that closed cell expandable microspheres can be combined with a material composition having electrical conductivity properties to form an electrically conductive porous composite having interconnected pores. A matrix of the expanded microspheres can bind the material composition having electrical conductivity properties. The resulting electrically conductive porous composites have good wettability and good porosity, and can be formed as part of an energy storage device with high cycling and recharge capability.

The expandable microspheres are preferably expandable polymer microspheres, such Expancel® (AkzoNobel N.V.), Advancell EM (Sekisui Chemical Co., Ltd.), Kureha Microsphere (Kureha Corp.), Dualite® (Chase Corp.), and Clocell® (PolyChem Alloy). Expancel® microspheres, for example, are small spherical thermoplastic particles that consist of a polymer shell encapsulating a fluid, such as a gas. When heated, the internal pressure from the fluid increases and the thermoplastic shell softens. Accordingly, with the fluid trapped inside the spheres, the volume of the microspheres increases.

The material composition having electrical conductivity properties preferably contains an electrochemically active particle and can also include an electrically conductive agent.

Compression and heat are preferably used to form the porous composites. The material composition having electrical conductivity properties is preferably mixed with expandable microspheres and then heated in a confined volumetric space, such as a mold. The process can be on a batch or continuous basis. The porous composites can be formed in situ in an energy storage device.

The material composition having electrical conductivity properties is preferably the majority of the porous composite.

The porosity of the electrically conductive porous composite is preferably 30% or more.

Mechanical reinforcement material can be added to increase the structural strength of the electrically conductive porous composites.

The electrically conductive porous composites as described can be used in an energy storage device, such as for example, a battery, capacitor, supercapacitor, or fuel cell. Pores can be filled with electrolyte. Such electrically conductive porous composites are beneficial to the manufacture of energy storage devices.

Additional aspects and advantages will be apparent from the following detailed description of preferred embodiments, which proceeds with reference to the accompanying drawings.

DETAILED DESCRIPTION OF PREFERRED EMBODIMENTS

An electrically conductive porous composite having interconnected pores can be made by mixing expandable microspheres with a material composition having electrical conductivity properties. The microspheres can be in a dry powder or an aqueous dispersion. Likewise, the material composition having electrical conductivity properties can be in a dry powder or an aqueous dispersion. The mixture can then be placed in a mold (or other volumetric confined space) and heated for a sufficient duration to bond the materials together. Expansion of the microspheres provides the necessary compression for bonding. The volume of the mold (which dictates pressure as the microspheres expand) and the temperature and duration of heating can be used to rupture at least a portion of the thermally-expanded polymer microspheres by the escape of the encapsulated fluid in the microspheres. After expansion, the mold is slowly cooled. The microspheres stay in an expanded state, bonded together. The electrically conductive porous composite is then removed from the mold. When an aqueous dispersion is present, the water can be evaporated off as part of the formation process. A mechanical reinforcement material can be placed at a desired location within the mold prior to heating the mixture. The electrically conductive porous composite is a solidified, conformable porous composite. As used herein, "solidified, conformable porous composite" means that the composite is a solid that has conformed to the shape of the volumetric confined space in which the expandable microspheres and the material composition having electrical conductivity properties were heated.

The mold (or other volumetric confined space) can be shaped and patterned as needed. Additionally, the electrically conductive porous composites can be further shaped after removal from the mold. The electrically conductive porous composites can be formed as a sheet or other desired geometry.

The same process can be repeated in a cell of a battery or other energy storage device. A free-flowing mixture of the powders is placed in the cell, the cell is capped, and then heat is applied to the cell. The fixed volume of the cell provides the necessary compression as the microspheres expand. It is not necessary to remove the electrically conductive porous composite from the cell. Electrolyte can be added directly to the cell after formation of the porous composites.

The porosity of the electrically conductive porous composite is preferably 30% or more, such as about 40% or more, about 50% or more, about 60% or more, about 70% or more, or about 80% or more, as determined by water porosity. For example, the porosity can be about 30% to about 90%, about 40% to about 90%, about 50% to about 90%, about 60% to about 90%, about 70% to about 90%, about 75% to about 90%, about 80% to about 90%, or about 85% to about 90%.

The electrically conductive porous composite is preferably both rigid and strong.

The electrically conductive porous composite can have a resistivity of 5000 ohm-cm or less. Preferably, the resistivity is less than 100 ohm-cm, more preferably, less than 1.0 ohm-cm, and even more preferably, less than 0.1 ohm-cm. For example, the resistivity can be about 0.001 ohm-cm to about 5,000 ohm-cm or about 100 ohm-cm to about 0.001 ohm-cm. Correspondingly, the electrically conductive porous composite can have a conductivity of at least 0.2 millisiemens/cm. Preferably, the conductivity is greater than 10 millisiemens/cm, more preferably, greater than 1 siemen/cm, and even more preferably, greater than 10 siemens/cm.

The electrically conductive porous composites (either formed in situ or in a mold) have good contact with separators and undergo no leaching from expanded microspheres. The electrically conductive porous composites have good acid-wettability, good porosity, and allow a battery to have high cyclability and recharge capability.

The electrically conductive porous composites can be used with a number of energy storage devices, such as a lithium ion battery, an alkaline battery, or a lead-acid battery.

The material composition having electrical conductivity properties can be about 30 wt % to about 95 wt % of the electrically conductive porous composite, more preferably about 50 wt % to about 95%, and even more preferably about 60 wt % to about 95 wt % of the electrically conductive porous composite. Enough material composition having electrical conductivity needs to be present to make the porous composite electrically conductive. The quantity needed to achieve conductivity will depend on factors such as the shape of the porous composite, density of the porous composite, specific application, etc.

Non-limiting examples of the electrochemically active particle include lithium intercalation compounds including lithium nickel oxide, lithium cobalt oxide, and lithium manganese oxide; lead (II) oxide, lead (II, III) oxide, and mixtures of lead and lead oxide; manganese dioxide; ruthenium oxide; tantalum oxide; zinc oxide; nickel; nickel oxide; zinc; lead; silver; iron; iron oxides; metal hydrides including lanthanum-nickel ($LaNi_5$); cobalt oxides; hydroxides of nickel, zinc, and cadmium, and cobalt; and crystalline or amorphous carbonaceous materials in the form of fiber, powder, or microbeads including natural or synthetic graphite, graphene, single or multi-walled carbon nanotubes, carbon black, coke, mesocarbon microbeads, or activated carbon.

The examples of electrochemically active particles are also non-limiting examples of electrically conductive agents. The electrochemically active particles are generally conductive, but not necessarily active in certain chemical settings. For example, carbon black, carbon nanotubes, and graphite are all conductive, but only chemically active in certain environments.

The electrically conductive porous composites can include additives that beneficially impact energy storage device performance. For example, the material composition having electrical conductivity properties can include the additive. Preferred additives include a hydrogen-evolution inhibitor, electrolyte-soluble pore former, an auxiliary binder, a wettability-enhancing agent, or combinations thereof. Certain additives can perform multiple functions.

Turning now to specific exemplary additives, the electrolyte-soluble pore former dissolves in the electrolyte (typically sulfuric acid for lead acid batteries and aqueous potassium hydroxide for alkaline batteries) after the battery is assembled and the electrolyte is added. Dissolution of the electrolyte-soluble pore former results in an increase in electrode porosity, modification to interconnectivity between mutually adjacent pores (i.e., tortuosity) of the electrode, and enhanced pore size distribution. The battery can optionally be flushed with fresh electrolyte after dissolution of the electrolyte-soluble pore former. For lead-acid batteries, preferably, the electrolyte-soluble pore former is magnesium hydroxide, magnesium oxide, or a combination thereof. The electrolyte-soluble pore former can include a sulfate of zinc, lithium, aluminum, magnesium, tin, potassium, or sodium. The electrolyte-soluble pore former can also include a carbonate of lithium, magnesium, potassium, or sodium. The electrolyte-soluble pore former can be combined with the material composition having electrical conductivity properties.

The hydrogen-evolution inhibitor can be distributed throughout the pore structure of the electrically conductive porous composites. Examples of hydrogen-evolution inhibitors include benzaldehyde derivatives, such as vanillin, ortho-anisaldehyde, 2-hydroxybenzaldehyde, 4-methoxybenzaldehyde, 2,4-dimethoxybenzaldehyde, 2,5-dimethoxybenzaldehyde, veratraldehyde (3,4-dimethoxybenzaldehyde), and 2,3,4 trimethoxybenzaldehyde.

Wettability-enhancing agents can include surface active molecules, such as sodium dodecylbenzene sulfonate or sodium dihexyl sulfosuccinate.

Examples of an auxiliary binder include waxes and polymer particles or fibers with different melting, wetting, or adhesion properties from the expandable microspheres.

The electrically conductive porous composite can include mechanical reinforcement, a metallic layer that is applied to the porous composite to form a metallized electric current collector, or both. The metallic layer can include, for example, a metallic-grid, perforated metal sheet, metal film, or metal foil. The metallic layer can be formed in a variety of ways, such as by sputter deposition, electroless deposition, electrodeposition, plasma spraying, roll coating of a metal slurry on the porous composite, or lamination of a porous or nonporous metal foil to the porous composite. The mechanical reinforcement material can be a support formed primarily on a major surface of the electrically conductive porous composite or embedded at least partially in a bulk structure of the electrically conductive porous composite. Examples of the support include a foam, a sheet, a film, a web, a membrane, a woven or non-woven mat, a mesh, and combinations thereof.

Optionally, the microspheres and the material composition having electrical conductivity properties can be combined with one or more of polyvinylidene fluoride, polyvinylidene fluoride copolymer, polyethylene oxide, and polyacrylonitrile in sufficient amount to form a gelled electrolyte after introduction of a liquid electrolyte.

The ability to form the electrically conductive porous composites in situ can have manufacturing benefits. For example, the electrically conductive porous composites can be made during battery assembly. This could facilitate manufacture of a lead-acid battery in a bipolar stack configuration with its attendant benefits in energy density and uniform current density. Other manufacturing benefits of the electrically conductive porous composites (either formed in situ or in a mold) will be apparent to those skilled in the art.

The electrically conductive porous composite can have a variety of shapes, such as cylindrical, tube-shaped (e.g., hollow cylinder or hollow cube), or sheet-shaped.

EXAMPLE 1

A cylindrical electrode was formed by bonding the following formulation of mixed dry powders in a threaded metal pipe with end caps:

7.6 g Zinc powder, average particle size 6-9 microns, 97.5% purity (Sigma Aldrich) 0.4 g Expancel 031 DU 40 powder (AkzoNobel)

In this particular example, the mixed dry powders contained a 19:1 mass ratio of Zinc powder to Expancel 031 DU (Dry Unexpanded) 40 microspheres with a total weight of 8 g. Powders were weighed in a jar with a lid and shaken to ensure proper mixing. The well mixed dry powder was poured into the threaded metal pipe whose ends were screw-capped. The end-capped pipe was then oven heated at 120° C. for 20 minutes. The hot pipe and its contents were allowed to slowly cool before the formed Zinc electrode was pounded out using a punch and hammer. The electrically conductive porous composite formed thereby was very firm and strong. The experiment was repeated with a polytetrafluoroethylene (PTFE) tube whose ends were tightly clamped, instead of with the screw-capped threaded metal pipe. It was easier to remove the electrically conductive porous composite from the PTFE tube than it was for the metal pipe.

EXAMPLE 2

A cylindrical electrode was formed by bonding the following formulation of mixed dry powders in a threaded metal pipe with end caps:

5.7 g Zinc powder, average particle size 6-9 microns, 97.5% purity (Sigma Aldrich) 0.3 g Expancel 031 DU 40 powder (AkzoNobel)

In this particular example, the mixed dry powders contained a 19:1 mass ratio of Zinc powder to Expancel 031 DU (Dry Unexpanded) 40 microspheres with a total weight of 6 g. Powders were weighed in a jar with a lid and shaken to ensure proper mixing. The well mixed dry powder was poured into the threaded metal pipe whose ends were screw-capped. The end-capped pipe was then oven heated at 120° C. for 20 minutes. The hot pipe and its contents were allowed to slowly cool before the formed Zinc electrode was pounded out using a punch and hammer. The electrically conductive porous composite formed thereby was very firm and strong. The experiment was repeated with a polytetrafluoroethylene (PTFE) tube whose ends were tightly clamped, instead of with the screw-capped threaded metal pipe. It was easier to remove the electrically conductive porous composite from the PTFE tube than it was for the metal pipe.

EXAMPLE 3

A cylindrical electrode was formed by bonding the following formulation of mixed dry powders in a threaded metal pipe with end caps:

2.85 g Zinc powder, average particle size 6-9 microns, 97.5% purity (Sigma Aldrich) 0.15 g Expancel 031 DU 40 powder (AkzoNobel)

In this particular example, the mixed dry powders contained a 19:1 mass ratio of Zinc powder to Expancel 031 DU (Dry Unexpanded) 40 microspheres with a total weight of 3 g. Powders were weighed in a jar with a lid and shaken to ensure proper mixing. The well mixed dry powder was poured into the threaded metal pipe whose ends were screw-capped. The end-capped pipe was then oven heated at 120° C. for 20 minutes. The hot pipe and its contents were allowed to slowly cool before the formed Zinc electrode was pushed out using a punch. The electrically conductive porous composite formed thereby was spongy with a smooth surface. The experiment was repeated with a polytetrafluoroethylene (PTFE) tube whose ends were tightly clamped, instead of with the screw-capped threaded metal pipe. It was easier to remove the electrically conductive porous composite from the PTFE tube than it was for the metal pipe.

The metal pipe of Example 1 and Example 2 was also utilized for Example 3. Likewise, the PTFE tube utilized for Example 1 and Example 2 was also utilized for Example 3. As can be seen by comparing Examples 1-3 to each other, as the mass of the Expancel powder, for a particular grade of microsphere and a given volume, drops below a particular threshold, then the resulting electrically conductive porous composite ceases to be rigid. Likewise, as the mass increases, for a given volume, the electrically conductive porous composite increases in rigidity, strength, and firmness.

EXAMPLE 4

A cylindrical electrode was formed by bonding the following formulation of mixed dry powders in a tightly sealed plastic jar:

57.0 g Zinc powder, average particle size 6-9 microns, 97.5% purity (Sigma Aldrich) 3.0 g Expancel 031 DU 40 powder (AkzoNobel)

In this particular example, the mixed dry powders contained a 19:1 mass ratio of Zinc powder to Expancel 031 DU (Dry Unexpanded) 40 microspheres with a total weight of 60 g. Powders were weighed in a plastic jar which was then tightly sealed and shaken to ensure proper mixing. The tightly sealed plastic jar and its well mixed powder contents were oven heated at 95° C. for 1 hour. The tightly sealed plastic jar provided the required compression to the expanding microspheres and led to the bonding of the mixed powder, forming a firm and strong Zinc electrode.

EXAMPLE 5

A flat electrode was formed by bonding the following formulation of mixed dry powders under compression in a Carver hydraulic press:

19.0 g Zinc powder, average particle size 6-9 microns, 97.5% purity (Sigma Aldrich) 1.0 g Expancel 031 DU 40 powder (AkzoNobel)

In this particular example, the mixed dry powders contained a 19:1 mass ratio of Zinc powder to Expancel 031 DU (Dry Unexpanded) 40 microspheres with a total weight of 20 g. Powders were weighed in a plastic jar with a lid and shaken to ensure proper mixing. The well mixed dry powder was pressed between designed molds with a gasket and heated at 120° C. under constant compression for 15 minutes. The mold was allowed to slowly cool before removing the sample.

EXAMPLE 6

A cylindrical electrode was formed by bonding the following formulation of mixed dry powders in a pipe with end caps:

0.88 g Zinc powder, average particle size 6-9 microns, 97.5% purity (Sigma Aldrich) 0.22 g Expancel 920 DU 120 powder (AkzoNobel)

In this particular example, the mixed dry powders contained a 4:1 mass ratio of Zinc powder to Expancel 920 DU (Dry Unexpanded) 120 microspheres with a total weight of 1.1 g. Powders were weighed in a jar with a lid and shaken to ensure proper mixing. The well mixed dry powder was poured into the same polytetrafluoroethylene (PTFE) tube used in Examples 1-3, whose ends were tightly clamped. The end-capped pipe was then oven heated at 200° C. for 60 minutes. The hot pipe and its contents were allowed to slowly cool before the solid Zinc electrode was removed from the tube. The electrically conductive porous composite formed thereby was firm and strong.

EXAMPLE 7

A cylindrical electrode was formed by bonding the following formulation of mixed dry powders in a pipe with end caps:

0.88 g Nickel powder, average particle size ~3 microns, 99.7% purity (Sigma Aldrich) 0.22 g Expancel 920 DU 120 powder (AkzoNobel)

In this particular example, the mixed dry powders contained a 4:1 mass ratio of Nickel powder to Expancel 920 DU (Dry Unexpanded) 120 microspheres with a total weight of 1.1 g. Powders were weighed in a jar with a lid and shaken to ensure proper mixing. The well mixed dry powder was poured into the same polytetrafluoroethylene (PTFE) tube used in Examples 1-3 and 6, whose ends were tightly clamped. The end-capped pipe was then oven heated at 200° C. for 60 minutes. The hot pipe and its contents were allowed to slowly cool before the solid Nickel electrode was removed from the tube. The electrically conductive porous composite formed thereby was firm and strong. The electrode was 3.58 cm in length with an average diameter of 0.88 cm and a mass of 1.02 grams. The bulk density was 0.466 g/cc and the calculated porosity was 86.5%. The axial resistivity of one section of the electrode, 0.528 cm long and 0.949 cm in diameter, was measured and determined to be 67 Ω-cm.

EXAMPLE 8

A flat electrode was formed by bonding the following formulation of mixed dry powders under compression in a Carver hydraulic press:

8.4 g Zinc powder, average particle size 6-9 microns, 97.5% purity (Sigma Aldrich) 2.1 g Expancel 920 DU 120 powder (AkzoNobel)

In this particular example, the mixed dry powders contained a 4:1 mass ratio of Zinc powder to Expancel 920 DU (Dry Unexpanded) 120 microspheres with a total weight of 10.5 g. Powders were weighed in a plastic jar with a lid and shaken to ensure proper mixing. The well mixed dry powder was pressed between designed molds with a gasket and heated at 180° C. under constant compression for 20 minutes. The mold was allowed to slowly cool for 60 minutes before removing the solid Zinc flat electrode. This electrode had a calculated porosity of 85.3% and a bulk density of 0.47 g/cc. A portion of this electrode, 2.02 cm wide×2.06 cm tall×0.204 cm thick, was cut out and the resistance was measured, both through-plane and in-plane. The through-plane resistivity was determined to be 1000 Ω-cm, while the in-plane resistivity was determined to be 13.2 Ω-cm.

EXAMPLE 9

A flat electrode was formed by bonding the following formulation of mixed dry powders under compression in a Carver hydraulic press:

7.12 g Nickel powder, average particle size ~3 microns, 99.7% purity (Sigma Aldrich) 1.78 g Expancel 920 DU 120 powder (AkzoNobel)

In this particular example, the mixed dry powders contained a 4:1 mass ratio of Nickel powder to Expancel 920 DU (Dry Unexpanded) 120 microspheres with a total weight of 8.9 g. Powders were weighed in a plastic jar with a lid and shaken to ensure proper mixing. The well mixed dry powder was pressed between designed molds with a gasket and heated at 180° C. under constant compression for 20 minutes. The mold was allowed to slowly cool for 60 minutes before removing the solid Nickel flat electrode. This electrode had a calculated porosity of 85.4% and a bulk density of 0.50 g/cc. A portion of this electrode, 1.88 cm wide×2.0 cm tall×0.201 cm thick, was cut out and the resistance was measured both through-plane and in-plane. The through-plane resistivity was determined to be 234 Ω-cm, while the in-plane resistivity was determined to be 1.0 Ω-cm.

EXAMPLE 10

A tube-shaped electrode with an opening through the middle was formed by bonding the following formulation of mixed dry powders around an inserted solid PTFE rod in a tightly sealed plastic jar and later withdrawing the inserted rod:

57.0 g Zinc powder, average particle size 6-9 microns, 97.5% purity (Sigma Aldrich) 3.0 g Expancel 031 DU 40 powder (AkzoNobel)

In this particular example, the mixed dry powders contained a 19:1 mass ratio of Zinc powder to Expancel 031 DU (Dry Unexpanded) 40 microspheres with a total weight of 60 g. Powders were weighed in a plastic jar. The jar lid was modified by permanently attaching a solid PTFE rod to its bottom and the solid rod was long enough that it came into contact with the jar bottom when the lid was tightly screwed on the jar. The idea here was to expand and compress the powders around the solid rod and then later withdraw the rod creating a tube-shaped electrode with an opening running through the middle.

The tightly sealed plastic jar and its well mixed powder contents were oven heated at 95° C. for 1 hour. The tightly sealed plastic jar provided the required compression to the expanding microspheres and led to the bonding of the mixed powder, forming a firm and strong tube-shaped electrode that had a hole through its center once the lid with its attached solid PTFE rod was removed.

It will be apparent to those having skill in the art that many changes may be made to the details of the above-described embodiments without departing from the underlying principles of the invention.

The invention claimed is:

1. An electrically conductive porous composite comprising:
   a thermally expanded polymer microsphere matrix binding a material composition having electrical conductivity properties to form an electrically conductive porous composite, the expanded polymer microsphere matrix comprising compression and heat-bonded polymer microspheres having been thermally-expanded to fill a fixed volume cavity, the expanded polymer microsphere matrix forming a three-dimensional interconnecting and interpenetrating pore network extending throughout the porous composite and in which the bound material composition having electrical conductivity properties is distributed,
   wherein the electrically conductive porous composite is rigid and comprises a porosity of 30% or more.

2. The porous composite of claim 1, in which the material composition having electrical conductivity properties comprises an electrochemically active particle.

3. The porous composite of claim 2, in which the electrochemically active particle includes lithium intercalation compounds including lithium nickel oxide, lithium cobalt oxide, and lithium manganese oxide; lead (II) oxide, lead (II, III) oxide, and mixtures of lead and lead oxide; manganese dioxide; ruthenium oxide; tantalum oxide; zinc oxide; nickel; nickel oxide; zinc; lead; silver; iron; iron oxides; metal hydrides including lanthanum-nickel (LaNi$_5$); cobalt oxides; hydroxides of nickel, zinc, cadmium, or cobalt; and crystalline or amorphous carbonaceous materials in the form of fiber, powder, or microbeads including natural or synthetic graphite, graphene, single or multi-walled carbon nanotubes, carbon black, coke, mesocarbon microbeads, or activated carbon.

4. The porous composite of claim 1, in which the material composition having electrical conductivity properties comprises an electrochemically active particle in combination with an electrically conductive agent.

5. The porous composite of claim 1, in which the microspheres and the material composition having electrical conductivity properties is combined with one or more of polyvinylidene fluoride, polyvinylidene fluoride copolymer, polyethylene oxide, and polyacrylonitrile in sufficient amount to form a gelled electrolyte after introduction of a liquid electrolyte.

6. The porous composite of claim 1, in which the material composition having electrical conductivity properties further comprises an additive.

7. The porous composite of claim 6, in which the additive comprises a hydrogen-evolution inhibitor, electrolyte-soluble pore former, an auxiliary binder, a wettability-enhancing agent, or combinations thereof.

8. The porous composite of claim 1, further comprising a metallic layer that is applied to the porous composite to form a metallized electric current collector.

9. The porous composite of claim 8, in which the metallic layer includes one of a metallic-grid, perforated metal sheet, metal film, and metal foil.

10. The porous composite of claim 8, in which the metallic layer includes one of a metal film formed by sputter deposition on, electroless deposition on, electrodeposition on, plasma spraying on, or roll coating of a metal slurry on the porous composite; or a porous or nonporous metal foil laminated to the porous composite.

11. The porous composite of claim 1, in which the porous composite consists essentially of the thermally expanded polymer microsphere matrix binding the material composition having electrical conductivity properties.

12. The porous composite of claim 1, in which the porous composite has a resistivity of 5,000 ohm-cm or less.

13. The porous composite of claim 1, in which the expanded microsphere matrix comprises thermally-expanded polymer microspheres ruptured by escape of an encapsulated fluid during thermal expansion of the polymer microspheres, unruptured thermally-expanded polymer microspheres, or combinations thereof.

14. The porous composite of claim 1, in which the material composition having electrical conductivity properties comprises about 30 wt % to about 95 wt % of the electrically conductive porous composite.

15. The porous composite of claim 1, further comprising a mechanical reinforcement material.

16. The porous composite of claim 15, in which the mechanical reinforcement material comprises a porous support formed primarily on a major surface of the electrically conductive porous composite or embedded at least partially in a bulk structure of the electrically conductive porous composite.

17. An energy storage device comprising an electrically conductive porous composite comprising:
   a thermally expanded polymer microsphere matrix binding a material composition having electrical conductivity properties to form an electrically conductive porous composite, the expanded polymer microsphere matrix comprising compression and heat-bonded polymer microspheres having been thermally-expanded to fill a fixed volume cavity, the expanded polymer microsphere matrix forming a three-dimensional interconnecting and interpenetrating pore network extending throughout the porous composite and in which the bound material composition having electrical conductivity properties is distributed,
   wherein the electrically conductive porous composite is rigid and comprises a porosity of 30% or more.

* * * * *